3,769,338
PROCESS FOR SYNTHESIZING CITRIC ACID
Michael J. Dagani and Tillmon H. Pearson, Baton Rouge, La., assignors to Ethyl Corporation, Richmond, Va.
No Drawing. Continuation-in-part of application Ser. No. 145,035, May 19, 1971. This application Nov. 9, 1971, Ser. No. 197,132
Int. Cl. C07c 59/16
U.S. Cl. 260—535 P                    27 Claims

ABSTRACT OF THE DISCLOSURE

It is disclosed that citric acid and its salts are produced by reacting a 1-halo-2-oxo-propane-3-carboxylic acid or a salt or ester thereof with cyanide to produce a 1-halo-2-cyano-2-hydroxy-propane-3-carboxylic acid or a salt or ester thereof, then converting the 1-halo-2-cyano-2-hydroxy-propane-3-carboxylic acid, its ester or salt to a 1-halo-2-hydroxy-propane-2,3-dicarboxylic acid or its ester or salt, then converting the 1-halo-2-hydroxy-propane-2,3-dicarboxylic acid or its ester or salt to a propane-1,2-epoxide-2,3-dicarboxylic acid or its ester or salt, then converting the propane-1,2-epoxide-2,3-dicarboxylic acid or its ester or salt to a 1-cyano-2-hydroxy-propane-2,3-dicarboxylic acid or its ester or salt, then converting the 1-cyano-2-hydroxy-propane-2,3-dicarboxylic acid, ester or salt to citric acid or a salt or ester thereof. Overall yields of citrate from diketene are 60 percent or higher.

CROSS REFERENCE TO RELATED APPLICATION

This application is a continuation-in-part of prior application Ser. No. 145,035, filed May 19, 1971.

BACKGROUND OF THE INVENTION

Field of the invention

The invention relates to the preparation of citric acid and of alkali metal salts of citric acid.

Description of the prior art

Citric acid and its salts are useful in different ways as exemplified by the following patents: As a plasticizer, U.S. Pat. 2,409,703; as a bleaching agent, U.S. Pat. 2,529,831; as a food anti-oxidant, U.S. Pat. 2,563,855; as a detergent component, U.S. Pat. 2,765,280.

The principal prior sources of citric acid and its derivatives are recovery from natural products such as citric fruits and production by micological or fermentation processes. The recovery of citric acid from natural products or sources is disclosed in U.S. Pats. 2,027,264; 2,193,904; and 2,396,115. The production of citric acid by micological processes is disclosed in U.S. Pats. 2,353,771; 2,739,923; 2,883,329 and 3,335,067.

Heretofore the chemical synthesis of citric acid or of its salts has proved to be very difficult. In fact, the only known U.S. patent relating to a chemical synthesis of citric acid is 3,356,721 which issued in 1967 and there is nothing in the patent to show that a significant yield of citric acid or its salts is obtained with the process described therein. Since the amount of natural source citric acid is limited, there has been a need in the art for a commercially attractive chemical synthesis process for producing citric acid or its salts.

OBJECTS

It is an object of the present invention to provide a process for synthesizing citric acid and salts of citric acid from readily available moderate cost raw materials.

Another object of the present invention is to provide process operations for producing compositions which are useful intermediates for the synthesis of citric acid and salts of citric acid.

Another object of the present invention is to provide a process for producing intermediate compositions that can be hydrolyzed to produce citric acid or its salts in high yield.

Another object of the present invention is to provide a process for producing the intermediate compositions of the preceding object via the cyanide cleavage of the epoxy group of a propane-1,2-epoxide-2,3-dicarboxylic acid or a salt or ester thereof to form 1-cyano-2-hydroxy-propane-2,3-dicarboxylic acid or a salt or ester thereof.

Another object of the present invention is to provide a process for producing propane-1,2-epoxide-2,3-dicarboxylic acid or a salt or ester thereof from a 1-halo-2-hydroxy-propane-2,3-dicarboxylic acid, or a salt or ester thereof.

Another object of the present invention is to provide a process for producing 1-halo-2-hydroxy-propane-2,3-dicarboxylic acid or a salt or ester thereof from a 1-halo-2-cyano-2-hydroxy-propane-3-carboxylic acid or a salt or ester thereof.

Another object of the present invention is to provide a process for producing a 1-halo-2-cyano-2-hydroxy-propane-3-carboxylic acid or a salt or ester thereof from a 1-halo-2-oxopropane-3-carboxylic acid or a salt or ester thereof.

Other and further objects and features of the present invention will become apparent upon a careful consideration of the following discussion.

SUMMARY OF THE INVENTION

The present invention provides, inter alia, a method of producing citric acid and its salts from 1-halo-2-oxo-3-carbonyl halide.

In accordance with one embodiment of this invention, 1-halo-2-oxo-3-carbonyl halide, which may be readily formed by the halogenation of diketene, is hydrolyzed in the presence of a lower alkanol such as ethanol to produce an ethyl ester of 1-halo-2-oxo-propane-3-carboxylic acid which is reacted with hydrogen cyanide to produce the ethyl ester of 1-halo-2-cyano-2-hydroxy-propane-3-carboxylic acid. The 1-halo-2-cyano-2-hydroxy-propane-3-carboxylic acid, ester or salt is then hydrolyzed to produce a 1-halo-2-hydroxy-propane-2,3-dicarboxylic acid, salt or ester.

The 1-halo-2-hydroxy-propane - 2,3 - dicarboxylic acid, ester or salt readily eliminates halogen when placed in a strongly basic system with alkali metal or alkaline earth metal ions producing by-product alkali or alkaline earth metal halide and forming a propane-1,2-epoxide-2,3-dicarboxylic acid, ester or salt.

In the presence of a basic cyanide-containing system, the propane-1,2-epoxide-2,3-dicarboxylic acid, ester or salt undergoes cleavage of the epoxide ring formed in the preceding reaction, producing a 1-cyano-2-hydroxy-propane-2,3-dicarboxylic acid, ester or salt.

On hydrolysis, the 1-cyano-2 - hydroxy - propane - 2,3-dicarboxylic acid, ester or salt is converted to a 2-hydroxy-1,2,3-propane tricarboxylic acid, ester or salt; vis, citric acid or an ester or salt thereof. In general, the hydrolysis of the final step is preferably conducted under strongly basic or acidic conditions influencing to a large extent the form of the product as citric acid, ester or salt. A strongly basic environment in the hydrolysis results in the conversion of esters to salts. A strongly acidic environment in the hydrolysis results in the conversion of esters to salts. A strongly acidic environment in the hydrolysis produces acid, preferably when the feed to hydrolysis is in the acid or salt form. It is apparent therefore that the preferred form for the feed to hydrolysis and the form of the product therefrom depend to a significant extent upon the choice of hydrolysis conditions. Ordinarily one prefers to use a form of feed to hydrolysis and to select hydrolysis conditions which produce the desired product form directly and in the best possible overall yield. On the other hand, it is evident that form changing steps can be performed even after the hydrolysis; for example, where citric acid is formed in an acidic hydrolysis, it is readily converted to the alkali metal salt form by reacting it with appropriate base. Likewise where a citric acid salt is produced in a basic hydrolysis, it is readily converted to citric acid by an acidification reaction with a strong mineral acid such as hydrochloric acid or sulfuric acid.

In a preferred embodiment of the present invention the starting 1-halo-2-oxo-3-carbonyl halide is selectively reacted with a lower alkanol having from 1 to about 6 carbon atoms per molecule to form a 1-halo-2-oxoalkoxy-carbonyl-propane. The ester thus obtained is reacted with HCN to form an ester containing a cyanohydrin structure ester is hydrolyzed to produce a 1-halo-2-hydroxy-3-alkoxycarbonyl-propane-2-carboxylic acid.

The 1-halo-2-hydroxy-3 - alkoxycarbonyl - propane-2-carboxylic acid can be processed further in several different ways. For example, it is readily converted to a dicarboxylic acid by combining with a strong acid such as HCl, and evacuating the system. Alcohol is pulled off forming 1-halo-2-hydroxy-propane - 2,3 - carboxylic acid. Alternately the 1-halo-2-hydroxy-3-alkoxycarbonyl-propane-2-carboxylic acid is reacted with a strong base in excess to convert the carboxyl groups to salt groups, also liberating the alcohol of the ester structure. Alternately with less base, the carboxyl group is saponified without converting the ester structure into salt and alcohol. In still another sequence, the 1-halo - 2 - hydroxy - 3 - alkoxy - carbonyl-propane-2-carboxylic acid is reacted with additional alcohol to form a double ester.

Regardless of which form is thus made available, the acid, ester or salt or combination is then reacted with a base. The principal reaction desired at this point in the reaction with the base is a halogen elimination reaction which forms a 1,2-epoxide structure. For this reaction at least enough base is required to be present to saponify all free carboxyl groups and to react with the halogen to form a halide-free salt. Generally speaking, a slight excess of the base is used unless ester hydrolysis is also desired at this point in which case an additional one or two mols of base per mol of ester is used. By this stage of the process, the ester form is generally no longer useful in controlling side reactions so that from this point on one usually prefers to continue with the double salt, usually of sodium or potassium. The typical compound existing at this point is the 2,3-disodium salt of propane-1,2-epoxide-2,3-dicarboxylic acid.

The 2,3-disodium salt of propane-1,2-epoxide - 2,3 - dicarboxylic acid is then reacted with a base cyanide system to cleave the epoxide ring and add cyanide producing the 2,3-disodium salt of 1-cyano-2 - hydroxy - propane - 2,3-dicarboxylic acid. Hydrolysis of the 2,3-disodium salt of 1-cyano-2-hydroxy-propane - 2,3 - dicarboxylic acid disodium salt is with either an acid or base to produce citric acid or a salt thereof. Where the ester-salt form has been carried through this point, e.g. the 2-sodium salt of 1-cyano-2 - hydroxy-3 - ethoxycarbonyl - propane - 2-carboxylic acid, alcohol is liberated in the hydrolysis and is readily recovered by vacuum off-gassing.

The foregoing processing is exemplified by the following series of equations. It is to be noted that to simplify terminology in this series, the acid form of the compositions involved is shown in most instances rather than the ester or other form.

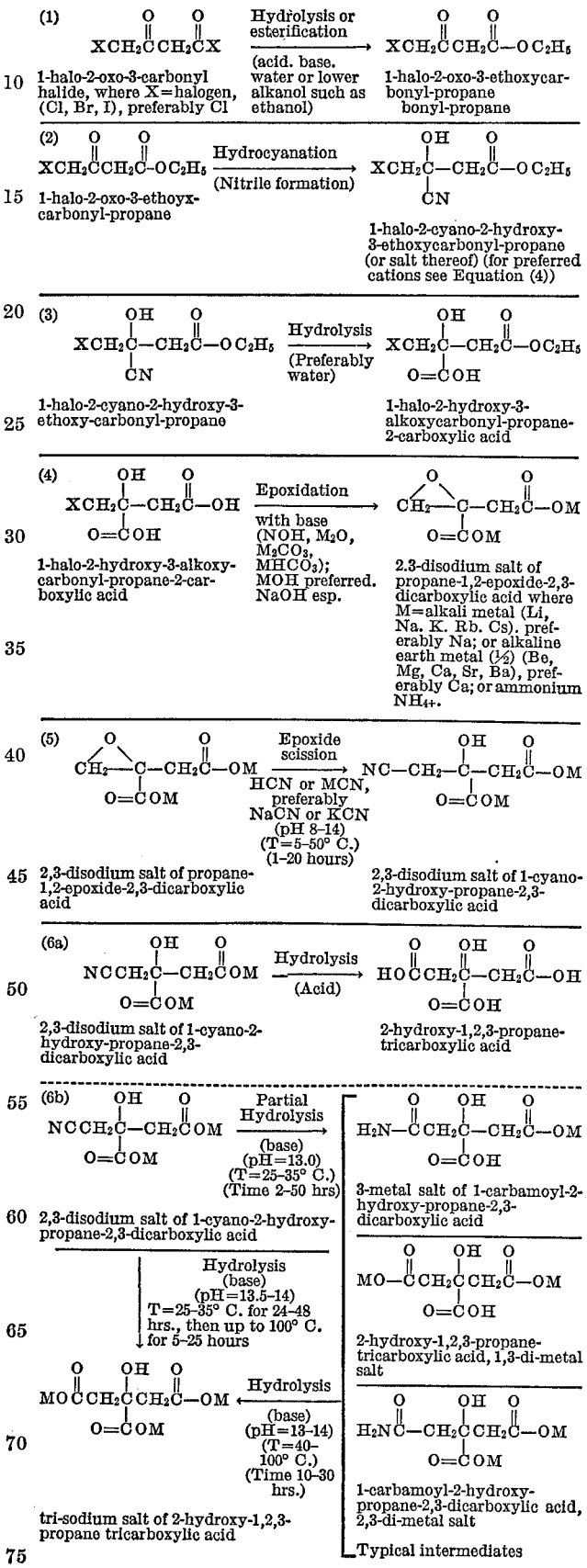

Typical intermediates

The foregoing process as exemplified by the equations is subject to numerous variations, many of which have been already discussed. Thus although the reactions are preferably conducted in an aqueous environment or in aqueous solution, it is possible to employ suitable anhydrous organic reaction media including protic solvents and esters in some of these reactions. Conversion between the acid and salt forms provide ways to enhance purification and by-product removal as well as to provide stable intermediates for storage or more convenient transportation to subsequent processing. Also in some instances, the use as reactants of esters rather than acids or salts facilitates handling and the selection of solvent systems. Thus, the fundamental processing steps discussed may be supplemented by form changing steps (i.e., neutralizations, saponifications, esterifications, ester hydrolysis etc.), purification steps, drying steps or the like.

Further, although the process is most preferably conducted on a continuous basis in an unbroken sequence, it is feasible to perform the process on a batch or semi-batch basis and also to interrupt the processing sequence operations, e.g. by storing or transporting intermediates for subsequent use in the succeeding process steps. In addition, in many instances several of the reactions described may be conducted concurrently or sequentially in a single environment to appear as a single processing step, while single reactions may be conducted in a staged manner to appear as several processing steps.

Inasmuch as this process is subject to numerous variations, the following are some of the process embodiments disclosed or provided by this invention.

(A) Converting 1 - halo-2-cyano-2-hydroxy-propane-3-carboxylic acid or salt or ester thereof to a salt or ester of propane-1,2-epoxide-2,3-dicarboxylic acid by a reaction with a base, converting the salt or ester of propane - 1,2 - epoxide - 2,3 - dicarboxylic acid to a salt or ester of 1 - cyano - 2 - hydroxy-propane-2,3-dicarboxylic acid via reaction with cyanide, and hydrolyzing the salt or ester of 1-cyano-2-hydroxy-propane-2,3-dicarboxylic acid to produce citric acid or a salt thereof.

(B) Hydrolyzing the cyano group of 1-halo-2-cyano-2-hydroxy-propane - 3 - carboxylic acid or a salt or ester thereof preferably with water at a pH of about same pH as that of a solution of 1-halo-2-hydroxy-propane-2,3-dicarboxylic acid to produce 1 - halo - 2 - hydroxy-propane-2,3-dicarboxylic acid or an ester thereof and then performing process (A).

(C) Subjecting 1 - halo - 2 - oxo-propane-3-carboxylic acid or a salt or ester thereof to reaction with hydrogen cyanide or a salt thereof to produce 1-halo-2-cyano-2-hydroxy-propane - 3 - carboxylic acid or a salt or ester thereof, and then performing process (B).

(D) Hydrolyzing 1 - halo - 2 - oxo-3-carbonyl halide to produce 1 - halo - 2 - oxo-propane-3-carboxylic acid or a salt or ester thereof, and then performing process (C).

(E) Reacting 1 - chloro - 2 - oxo-3-carbonyl chloride with water to produce 1 - chloro- 2 - oxo-propane-3-carboxylic acid, reacting 1-chloro-2-oxo-propane-3-carboxylic acid with ammonium alkali metal or alkaline earth metal ions and with cyanide ions in an aqueous system to produce a salt of 1-chloro-2-oxo-propane-3-carboxylic acid and HCN and reacting the salt of 1-chloro-2-oxo-propane-3-carboxylic acid with HCN to form a salt of 1-chloro-2-cyano-2-hydroxy-propane-3 - carboxylic acid acidifying the salt of 1 - chloro - 2-cyano-2-hydroxy-propane-3-carboxylic acid with mineral acid to produce 1-chloro-2-cyano-2-hydroxy-propane-3-carboxylic acid and an alkali metal salt or an alkaline earth metal salt, solvent extracting the 1 - chloro - 2 - cyano - 2 - hydroxy-propane-3-carboxylic acid to recover the acid from the alkali metal or alkaline earth metal salt and recovering the acid from the solvent, hydrolyzing the recovered 1-chloro-2-cyano-2-hydroxy-propane-3-carboxylic acid to produce 1-chloro-2-hydroxy-propane-2,3-dicarboxylic acid, converting the 1-chloro-2-hydroxy-propane-2,3-dicarboxylic acid to a salt of propane - 1,2 - epoxide-2,3-dicarboxylic acid by reaction with a base, reacting the salt of propane-1,2-epoxide-2,3-dicarboxylic acid with mineral acid to convert the salt to an acid structure forming propane-1,2-epoxide-2,3-dicarboxylic acid and a salt of the mineral acid and the base reacted in the preceding step, recovering the propane-1,2-epoxide-2,3-dicarboxylic acid, converting the propane-1,2-epoxide-2,3-dicarboxylic acid to a salt of 1-cyano-2-hydroxy-propane-2,3-dicarboxylic acid by reacting the acid with alkali metal or alkaline earth metal ions and with cyanide ions in an aqueous system at a pH of from about 8 to about 14, and hydrolyzing the salt of 1-cyano-2-hydroxy-propane-2,3-dicarboxylic acid with a hydroxide, oxide, carbonate or bicarbonate of an alkali metal or alkaline earth metal to produce a salt of citric acid.

(F) Producing a compound readily hydrolyzable to citric acid or its salts by converting 1-halo-2-hydroxy-propane-2,3-dicarboxylic acid or a salt or ester thereof to a salt or ester of propane-1,2-epoxide-2,3-dicarboxylic acid by a reaction with a base, and converting the salt or ester of propane-1,2-epoxide-2,3-dicarboxylic acid to a salt or ester 1-cyano-2-hydroxy-propane-2,3-dicarboxylic acid via reaction with cyanide. This last named compound is readily hydrolyzed to citric acid by acidic hydrolysis or to citric acid salts via basic hydrolysis.

It can be seen from the foregoing that numerous new and highly useful intermediates are formed in the above process. Accordingly, this invention also provides as new compositions the following:

(I) 1 - halo - 2 - cyano-2-hydroxy-propane-3-carboxylic acid and the alkali metal, alkaline earth metal and ammonium salts thereof, and the lower alkyl esters thereof whose alkyl groups have from one to about six carbon atoms each, particularly the compositions where the 1-halo group is 1-chloro. Salts of the alkali metals are preferred, particularly the sodium and potassium salts. The free acid itself is particularly preferred as are the ethyl esters.

(II) 1 - halo - 2 - hydroxy-propane-2,3-dicarboxylic acid and the salts and the lower alkyl esters thereof, particularly the compositions where the halogen is chlorine. The free acid, the esters, and the alkali metal salts thereof, particularly the sodium and potassium salts, are preferred.

(III) Propane - 1,2 - epoxide - 2,3-dicarboxylic acid and the lower alkyl esters thereof and the alkali metal, alkaline earth metal and ammonium salts thereof, preferably the free acid or the alkali metal salts, particularly the sodium and potassium salts, most particularly the disodium salt.

(IV) 1-cyano-2-hydroxy-propane-2,3-dicarboxylic acid and the lower alkyl esters thereof and the alkali metal, alkaline earth metal and ammonium salts thereof particularly the salts of the alkali metals, especially the sodium and potassium sats.

(V) 1-carbamoyl-2-hydroxypropane - 2,3 - dicarboxylic acid and the lower alkyl esters thereof and the alkali metal, alkaline earth metal and ammonium salts thereof particularly the sodium, potassium, cacium and magnesium salts.

Some of the difficulties connected with the chemical synthesis of citric acid or the salts thereof arise from the fact that numerous reactions are involved and it is not possible to perform them in any entirely stepwise non-concurrent manner or to avoid side reactions, decompositions or regressions. Furthermore, in most instances the pH is important and usually is desirably controlled within fairly narrow limits for achieving optimization of the reactions that are desired at any particular point and minimizing concurrent undesired reactions. Many starting materials and intermediates that might be considered for a citric acid process are very difficult to produce or are extremely unstable under conditions required for some of the reactions being subject to decomposition, isomerization, polymerization, cyclization and other side reactions. Where one attempts stepwise conversions to produce or introduce the different functional groups, it is usually discovered that the conditions necessary to make one group proceed in a forward direction toward the product cause destruction or regression of other groups. The dirth of patents relating to the synthesis of citric acid makes it abundantly clear that the problem is very difficult of solution and that for the most part no one has previously found a way to produce citric acid synthetically when starting from diketene. Since the amount of natural source citric acid is limited and citric acid and its salts are highly useful materials in numerous ways as herein pointed out, there is a need for a synthesis process for producing citric acid or its salts. Furthermore, it is desirable that such a chemical synthesis process provide a reasonable economic basis such as good yields, low cost readily available chemical raw materials, and the like.

EXEMPLARY CONDITIONS

The pyrolysis of acetone or acetic acid to produce ketene is well known in the art as typified by U.S. Pats. 2,776,192; 2,820,058; 2,856,426 and 2,863,922. The dimerization of ketene is also well known in the art, being described for example in U.S. Pats. 2,668,640; 2,820,872 and 2,848,496. Pyrolysis involves temperatures of the order of "dull red heat." The dimerization of ketene occurs at more moderate temperatures such as 10–70° C.

The reaction of diketene with halogen to produce 1-halo-2-oxo-3-carbonyl halide is also known as described in Dutch Pat. 7,007,736. It is performed either neat or in the presence of diluents such as carbon tetrachloride at from about (—10 to —30° C.) with about stoichiometric reactant proportions.

The reaction of 1-halo-2-oxo-3-carbonyl halide with alcohol to produce the alkyl ester is preferably conducted in an excess of alcohol ranging up to about a 10 times molar excess. Preferably, at least one mol excess above the stoichiometric mol per mol relationship is used. Preferred alcohols are alkanols and glycols having from 1 to about 6 carbon atoms per molecule, particularly methanol, ethanol, propanol and isopropanol. Other alkanols are butanol, isobutanol, 2-methyl butanol, 2-methyl butanol-2, etc. Typical glycols are ethylene glycol, propylene glycol, butane-1,4-diol, butane-1,3-diol, pentane-2,4-diol, and the like. Ethanol and methanol are particularly preferred. Typically, an esterification catalyst is used such as an organic base, typically a tertiary amine such as triethyl amine, tributyl amine, and the like. Other catalysts are alkali metal carboxylates such as sodium acetate, potassium acetate, sodium isopropylate, sodium formate, lithium acetate, rubidium acetate, and the like, pure and in various mixtures. Generally, the alkali metal salts of the lower monobasic carboxylic acids such as formic acid, acetic acid and propionic acid are preferred. The amount of catalyst used ranges from about 0.005 to about 0.5 mol per mol of 1-halo-2-oxo-3-carbonyl halide. Typically, the esterification reaction is conducted for about 15–30 minutes at 0–25° C. and proceeds with yields of 90 percent or higher. The catalyst increases the yield of the desired product and minimizes by-products, particularly the enol ether.

After the esterification, the product is washed with water to remove excess alcohol and catalyst. The removal of alcohols, water and other volatiles may be facilitated in a preliminary distillation or stripping operation. The product is then preferably fractionally distilled to recover the desired 1-halo-2-oxo-3-alkoxycarbonyl-propane, typically 1 - chloro - 2-oxo-3-ethoxycarbonyl. Distillation is typically at 15 mm. Hg pressuure absolute with the bulk of the 1-chloro-2-oxo-3-ethoxycarbonyl-propane passing overhead at from 75 to 110° C. The distillation improves product quality by removing esterification by-products such as ethyl acetoacetate, ethyl α-chloro acetoacetate, α,γ-dichloro acetoacetate and the enol ether of γ-chloro acetoacetate. Greater purity of the ethyl γ-chloro acetoacetate ester is obtained by redistillation. It is usually preferred that the intermediate product be distilled at least once; however, in instances where a less pure final product is accepable, the distillation removal of the by-products is generally omitted.

The 1-chloro-2-oxo-3-ethoxycarbonyl-propane is reacted with HCN in a reaction selective at the carbonyl function of the aceto group. The reaction is preferably performed using a catalyst such as alkali metal cyanide in amounts from about 0.005 to about 1 percent by weight based on the ester. Preferably, the alkali metal cyanide is sodium cyanide or potassium cyanide solubilized with alcohol. Generally, any lower alkanol or glycol solubilizer such as those mentioned for esterification reactants may be used; however, it is generally preferred that the alkanol or glycol used be the same as that used for the preceding esterification step to minimize the number of contaminants and the variety of raw materials used. Thus, a typical solubilizing alkanol is ethanol or methanol. Usually no more alcohol is used than that required to solubilize the catalyst, typically about 10 percent by weight based on the ester where the ester is 1 - chloro - 2-oxo-ethoxycarbonyl-propane and the catalyst is about 1 percent sodium cyanide.

The reaction of the ester with HCN is conducted at a temperature of from about —20 to about 40° C. for from about 10 minutes up to about 6 hours. Typically, the reaction is conducted in two stages at different temperatures, the first being at about 0° C. for from about ½ to about 2 hours, the second at about 30° C. for from about ½ to about 2 hours.

In the reaction it is usually preferred to provide an excess of HCN ranging from a slight excess above the stoichiometric 1 mol per mol of ester up to about 10 mols excess above the stoichiometric amount. In a typical case, 1 mol excess is used, the feed being 2 mols of HCN per mol of ester. This reaction initially forms the cyanohydrin and in many instances proceeds with virtually a stoichiometric yield of 98 percent or better.

Following the conversion of the 2-oxo-function of the ester with HCN, the HCN is removed and the resulting system is reacted with acid in an acidic aqueous system to convert the cyanohydrin structure to a hydroxy acid structure. The acid is then neutralized with base to form the hydroxy acid salt function at the 2 position. Typical acid used is inorganic acid such as HCl, $H_2SO_4$ or $H_3PO_4$. Generally, preferred acid is HCl. The acid is used in strong concentration, pH from about 1 to about 3. Typical base used for this conversion is alkali metal hydroxide, oxide, carbonate or bicarbonate with the preference being for sodium or potassium carbonate. The amount of base required is at least about 1 mol per mol of converted ester fed. Usually at least one mol of base is fed to insure complete reaction and neutralization of residual acid; however, a large excess of base is not desired at this point to avoid hydrolysis of the ester grouping and to avoid interference with the subsequent reaction. Thus, it is typical to feed enough base to maintain a slightly alkaline system having a pH from about 6–8. This reaction with base proceeds readily at from about 0 to about 100° C. but usually is performed at about room temperature or at the temperature of the effluent from the preceding step or at the temperature of the succeeding step. Higher temperatures, although useful, are not necessary and are generally avoided to minimize hydrolysis losses of the ester.

The typical intermediate at this point contains a methoxy or ethoxy structure, plus a 2-sodium or a 2-potassium structure:

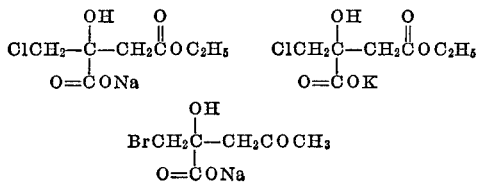

On reaction in strong caustic solution such as NaOH, KOH, or Ca(OH)$_2$ the 1 halogen forms a salt of the metal constituency of the caustic and water is eliminated, forming a 1,2-epoxide structure.

The 1,2-epoxide is then reacted with alkali metal cyanide such as NaCN or KCN to produce a (1-cyano-2-hydroxy) cyanide substitution product. Usually some residual base is present in this reaction environment from the preceding reaction or is added for pH control; however, generally this is inadequate to effect hydrolysis of the cyanide substitution function or the ester function. Hydrolysis of these is preferably performed in a subsequent system to minimize undesired side reactions, such as hydrolysis of the ester, during the cyanide substitution reaction.

For the reaction with alkali metal cyanide, the intermediate and an alkali metal cyanide such as sodium cyanide or potassium cyanide are fed at about 30 percent by weight concentration of the salt in an aqueous solution. Typically, the solution containing the intermediate also contains residual base from the preceding reaction and is added to the alkali metal cyanide solution maintained at about 50° C. in a 1:1 mol ratio during a period of about 15–20 minutes. This results in the formation of a cyanide substitution product containing additionally the ester formation and the hydroxy acid salt function. Normally it is not necessary to remove or neutralize any base present with the epoxide ester salt.

After the cyanide induced epoxide cleavage reaction, the product is hydrolyzed preferably to convert both the cyanide substitution function and the ester function to salt functions. The hydrolysis is performed either with an acid, such as concentrated HCl, to produce citric acid product or is performed with a base to produce a trisodium salt product. Usually a total of from about three to about ten mols base is supplied per mol of cyanide substitution product for basic hydrolysis. Generally, a strong base is preferred and needed such as an alkali metal oxide or hydroxide, typically NaOH or KOH. The reaction is generally performed for a prolonged period of from about 1 to about 24 hours at elevated temperatures of 50–100° C. Typically, the reaction is conducted for about 10 hours at about 80° C. at a pH from about 8 to about 12 for basic hydrolysis or from about 1 to about 2 for acidic hydrolysis. Preferably, the reaction is conducted at about atmospheric pressure or at sub-atmospheric pressure to facilitate the removal of the liberated esterification alkanol and other vapors to favorably influence the equilibria involved.

When hydrolysis is conducted in an aqueous system with from about 3 to about 10 mols of NaOH or KOH per mol of cyanide substitution product, sodium citrate dihydrate crystallizes from the excess caustic containing system and is removed by decantation, filtration, centrifuging, or the like. Where desired, the product thus recovered may be purified additionally, for example, by washing with alcohol or by recrystallization or both, and may be dried to remove all or part of the water of hydration and occluded or surface moisture. The one-pass direct crystallization product yield is generally about 10 percent; however, this can be improved overall by recycle; for example, the mother liquor obtained after the separation of the crystals is recycled to provide at least part of the base used in prior steps of the process.

The following examples indicate preferred embodiments of the present invention.

EXAMPLE I

To a stirred mixture of ethanol (64 g.) and sodium acetate (20 g.) was added 1 - chloro-2-oxo-3-carbonyl-chloride (prepared from 14.0 g. diketene and 12.3 g. chlorine in 25 ml. of carbon tetrachloride). The temperature was maintained at 0° C. After the addition was complete, the reaction mixture was stirred at 30° C. for 1 hour, washed with water, filtered and then distilled. After the water and ethanol were removed, five fractions were obtained having the following compositions and weights.

Fraction 1:
 B.P. <85°/15 mm.; 0.5 g.
 30 percent ethyl acetoacetate
 22 percent ethyl α-chloroacetoacetate
 39 percent 1-chloro-2-oxo-3-ethoxycarbonyl-propane Fraction 2:
 B.P. 85–95°/15 mm.; 0.75 g.
 20 percent ethyl acetoacetate
 21 percent ethyl α-chloroacetoacetate
 50 percent 1-chloro-2-oxo-3-ethoxycarbonyl-propane Fraction 3:
 B.P. 95–77°/15 mm.; 1.20 g.
 18 percent ethyl acetoacetate
 19 percent ethyl α-chloroacetoacetate
 63 percent 1-chloro-2-oxo-3-ethoxycarbonyl-propane Fraction 4:
 B.P. 97–103°/15 mm.; 17.20 g.
 7 percent ethyl α-chloroacetoacetate
 93 percent 1-chloro-2-oxo-3-ethoxycarbonyl-propane Fraction 5:
 B.P. 86–89°/3 mm.; 0.60 g.
 62 percent 1-chloro-2-oxo-3-ethoxycarbonyl-propane
 38 percent ethyl α,γ-dichloroacetoacetate.

The above data indicate a 98 percent conversion of chlorinated diketene and a 67 percent yield of 1-chloro-2-oxo-3-ethoxycarbonyl-propane.

The product from fraction 4 was again distilled to recover purified 1-chloro-2-oxo-3-ethoxycarbonyl-propane.

A mixture of 1-chloro-2-oxo-3-ethoxycarbonyl-propane (61 g.), ethanol (7 ml.) and hydrogen cyanide (17 g.) was cooled to 0° and 150 mg. of sodium cyanide was added. The reaction mixture was kept at 0° for 1.5 hr. and then at 25° for 1 hr. About 0.2 ml. of concentrated sulfuric acid was added and the cyanohydrin was distilled, B.P. 110–112°/2 mm., to give 67 g. of colorless liquid (96 percent yield). The NMR and infrared spectra were consistent for the expected product.

A mixture of cyanohydrin (45 g.) and 100 ml. of concentrated hydrochloric acid were stirred overnight at 75–80°. After cooling, ammonium chloride precipitated and was filtered. The acidic solution was extracted with ether to give 42 g. (86 percent yield) of 1-chloro-2-hydroxy-3-ethoxycarbonyl-propane-2-carboxylic acid. A small sample was esterified with diazomethane and analyzed by gas chromatography and shown to be 95 percent pure.

The hydroxy acid water solution was neutralized with one equivalent of potassium carbonate to give a 30 wt. percent solution (in water) of the potassium salt of the acid. The salt solution was added to one equivalent (1 mol per mol) (based on ester) of potassium cyanide in water (30 percent by weight) of 50° over a 15 minute period. The resulting solution was stirred at 50° for 1 hr. and then used without purification in the next step.

The aqueous solution was refluxed with excess concentrated hydrochloric acid overnight. After evaporation to dryness in vacuo the residue was esterified and analyzed for trimethyl citrate. There was obtained a 7–11 percent yield of citric acid.

EXAMPLE II

The production of 1-chloro-2-oxo-3-carbonyl-chloride was repeated. A 50 wt. percent solution of diketene in carbon tetrachloride was chlorinated until an equivalent molar amount of chlorine Cl$_2$ (one mol per mol) had reacted. The temperature was maintained between −20 and 0° C. by appropriate cooling. The product was analyzed by NMR (nuclear magnetic resonance) and found to be 1-chloro-2-oxo-3-carbonyl-chloride.

EXAMPLE III

The esterification portion of Example I was repeated: however, the esterification reaction was performed by mixing 8.2 mols ethanol and 0.2 mol sodium acetate then adding 2.3 mols of 1-chloro-2-oxo-3-carbonyl-chloride in 200 ml. carbon tetrachloride so that the temperature did not rise above 25° C. The resulting solution was washed several times with water, dried over calcium sulfate and analyzed by vapor phase chromatography. The following composition was found: 83 percent 1 - chloro-2-oxo-3-ethoxycarbonyl-propane, 13 percent ethyl α-chloroacetoacetate and 4 percent ethyl α,γ-dichloroacetoacetate.

EXAMPLE IV

In a comparative run the esterification reaction of Example II was repeated without the sodium acetate. The product composition as determined by vapor phase chromatography was 11 percent ethyl α-chloroacetoacetate, 62 percent 1-chloro-2-oxo-3-ethoxycarbonyl-propane, 16 percent ethyl α,γ-dichloroacetoacetate and 7 percent enol ether (CI—CH$_2$C(OEt)=CH—CO$_2$Et).

EXAMPLE V

Example I is repeated; however, after the reaction of the 1-chloro-2-oxo-3-ethoxycarbonyl-propane and the hydrogen cyanide, the product is stripped under vacuum to remove hydrogen cyanide and ethanol providing crude (nondistilled) cyanohydrin for the subsequent step.

EXAMPLE VI

Example I is repeated through the cyanohydrin acid hydrolysis step. The acid thus obtained is 1-chloro-2-hydroxy-3-ethoxycarbonyl-propane-2-carboxylic acid. It is reacted with sodium hydroxide and then is reacted with sodium cyanide in water. After a reaction with sodium hydroxide and prior to the reaction with sodium cyanide, the composition preferably is an aqueous solution of the 2,3-disodium salt of propane-1,2-epoxide-2,3-dicarboxylic acid. This composition results when there is present about 3 or more atoms of sodium per mol of chloro acid. After the cyanide cleavage reaction, the composition is preferably a solution of the 2,3-disodium salt of 1-cyano-2-hydroxy-propane-2,3-dicarboxylic acid. The cyanide substitution product resulting from the reaction with sodium cyanide then in turn is reacted with strong NaOH in solution containing about 5 mols of NaOH per mol of cyanide substitution product to produce trisodium citrate hydrate which precipitates from the solution. The trisodium citrate hydrate is separated from the mother liquor and the mother liquor recovered for recycle to the basic hydrolysis of the cyanide substitution product.

EXAMPLE VII

An aqueous solution of 1-chloro-2-carbamoyl-2-hydroxypropane-3-carboxylic acid in approximately 1 molar concentration was heated at 90° C. for 2 hours with concentrated hydrochloric acid. The composition resulting was analyzed by NMR (nuclear magnetic resonance) and indicated the presence of ammonium chloride in addition to two AB patterns for the chloromethylene structure (Cl<u>CH$_2$</u>—) and the alpha methylenes (—C(OH)(COOH)<u>CH$_2$</u>COOH)

The aqueous solution was extracted with ether and the combined ether extracts were dried with calcium sulfate and then subjected to vacuum evaporation to remove the ether. The liquid solidified after pumping at 1 to 2 mm. pressure absolute and 80° C. The NMR spectrum had a singlet at 3.80δ (Cl—CH$_2$—) and an AB pattern at 2.85δ (—C(OH)(COOH)CH$_2$COOH) and was identical to the spectrum used as standard for 1-halo-2-hydroxy-propane-2,3-dicarboxylic acid.

EXAMPLE VIII 1-chloro-2-hydroxy-3-ethoxy carbonyl propane-2-carboxylic acid was heated with concentrated hydrochloric acid at 110° C. for 4 hours, extracted with ether, recovered from the ether extract and analyzed by NMR. The starting material was not hydrolyzed. The ether extract was then heated at 80° C. at a pressure of 1 to 2 mm. of mercury absolute. After 20 to 30 minutes, a solid had formed from the liquid ester. The solid was recovered and analyzed by NMR and found to correspond identically to 1-chloro-2-hydroxy-propane-2,3-dicarboxylic acid.

EXAMPLE IX 1.82 grams (10 millimols) of 1-chloro-2-hydroxy-propane-2,3-dicarboxylic acid in 5 ml. of water at about 0° C. was reacted with 1.20 grams (30 millimols) NaOH in 5 ml. of water, the NaOH solution being added dropwise so that the temperature did not rise above 17° C. The resulting solution was stirred for 15 minutes and then analyzed by NMR which indicated that the formation of the disodium epoxide salt was complete. The product was the 2,3-disodium salt of propane-1,2-epoxide-2,3-dicarboxylic acid. The pH of the solution was 12.5. Sodium cyanide, 0.57 gram (11 millimols) which represented a 10 percent excess using 95 percent material, was added in one portion. The pH was adjusted to 11.0 by the addition of HCl. After five minutes, the pH was 11.33. Thereafter the pH was maintained at 11.4 by the addition of HCl. The concentration during this reaction was about 10 millimols per 10 milliliters or 1 molar.

After standing overnight at ambient temperature and without pH control, the sample was analyzed by NMR indicating the presence of about 47 mol percent nitrile (disodium salt of 1-cyano-2-hydroxy-propane-2,3-dicarboxylic acid), 53 percent residual epoxide. The pH at this point was 12.7. After a total of 24 hours, the NMR indicated 65–83 mol percent conversion to nitrile. Again the sample was allowed to stand overnight and then analyzed by NMR which indicated 14 percent disodium salt of 1,2-dihydroxy-propane-2,3-dicarboxylic acid, 10 percent residual disodium salt of propane-1,2-epoxide-2,3-dicarboxylic acid, and 76 percent disodium salt of 1-cyano-2-hydroxy-propane-2,3-dicarboxylic acid. The sample was then stirred at 30° C. for one hour, following which 0.50 gram (12.5 millimols) NaOH was added. The mixture was then heated to 70° C. and agitated for 3.6 hours, following which it was analyzed by NMR. At this point the product contained about 7.2 mols trisodium citrate representing a yield of 72 percent of the starting material to citrate.

EXAMPLE X 1.96 grams (10.8 millimols) of 1-chloro-2-hydroxy-propane - 2,3-dicarboxylic acid was cooled to about 0° C. and then 1.32 grams (32.4 millimols) of sodium hydroxide in 5 ml. of water was added dropwise so that the temperature did not rise above 20° C. NMR analysis after about 8 minutes indicated that the epoxide formation was essentially complete producing the 2,3-disodium salt of propane-1,2-epoxide-2,3-dicarboxylic acid. After 15 minutes, the solution was diluted to 15 ml. to give an 0.7 molar epoxide concentration. Then 0.68 gram of sodium cyanide (13.2 millimols) was added to the solution, the temperature being 30° C. and the pH 12.5. After 15 minutes the pH dropped to 12.3 as the NaOH was consumed. After about one hour from the time of the cyanide addition, the pH was 11.96. Analysis by NMR indicated that the reaction had proceeded slowly up to this point. Then the system was heated to 70° C. The pH began to decrease more rapidly dropping to 10.3 one-half hour later. After two hours and 40 minutes from the time of the temperature was increased to 70° C., NMR analysis indicated that substantially all of the epoxide had reacted. 45 minutes later, 0.53 gram (11.0 millimols) NaOH was added. 25 minutes after this latter addition of NaOH, the NMR spectrum showed approximately 28 percent of the 2,3-disodium salt of 1,2-dihydroxy-propane- 2,3-dicarboxylic acid, 22 percent of the 2,3-disodium salt of 1-cyano-2-hydroxy-propane-2,3-dicarboxylic acid, 2 percent of sodium acetate and 48 percent of a mixture of the 2,3-disodium salt of 1-carbamoyl-2-hydroxy-propane-2,3-dicarboxylic acid and the trisodium salt of 2-hydroxy-1,2,3-propane tricarboxylic acid. One-half hour later, the distribution had changed to 35 percent, 9 percent, 2 percent and 53 percent, respectively. After another hour, the analysis had changed to 24 percent, 0 percent, 3 percent and 73 percent, respectively. After standing overnight in ambient temperature, the NMR analysis indicated the following distribution: 30 percent, 0 percent, 3.5 percent and 66 percent, respectively. This solution was then heated for an adidtional hour at 70° C. and again analyzed by NMR. The yield of citrate was 58 to 71 percent.

What is claimed is:

1. A process for producing citric acid or salts thereof which comprises:
   (1) converting 1-halo - 2 - hydroxy-propane-2,3-dicarboxylic acid, or a salt of ester thereof to a salt or ester of propane - 1,2 - epoxide - 2,3 - dicarboxylic acid by a reaction with a base,
   (2) converting the salt or ester of propane - 1,2-epoxide - 2,3 - dicarboxylic acid to a salt or ester of 1 - cyano - 2 - hydroxy - propane - 2,3 - dicarboxylic acid via reaction with cyanide, and
   (3) hydrolyzing the salt or ester of 1-cyano-2-hydroxypropane - 2,3 - dicarboxylic acid to produce citric acid or a salt thereof.

2. A process according to claim 1 which comprises:
   (1) converting 1 - halo - 2 - hydroxy-propane - 2,4-dicarboxylic acid or a salt thereof to a salt of propane - 1,2 - epoxide - 2,3 - dicarboxylic acid by reaction with a base,
   (2) converting the salt of propane - 1,2 - epoxide-2,3-dicarboxylic acid to a salt of 1-cyano - 2 - hydroxypropane - 2,3 - dicarboxylic acid via reaction with cyanide, and
   (3) hydrolyzing the salt of 1 - cyano - 2 - hydroxypropane - 2,3 - dicarboxylic acid to produce citric acid or a salt thereof.

3. A process according to claim 1 which comprises:
   (1) converting 1 - chloro - 2 - hydroxy - propane-2,3-dicarboxylic acid to a salt of propane - 1,2 - epoxide-2,3 - dicarboxylic acid by reaction with a hydroxide, oxide, carbonate or bicarbonate of an alkali metal or an alkaline earth metal,
   (2) converting the propane - 1,2 - epoxide - 2,3 - dicarboxylic acid to a salt of 1 - cyano - 2 -hydroxypropane - 2,3 - dicarboxylic acid via reaction with an alkali metal or alkaline earth metal cyanide, and
   (3) hydrolyzing the salt of 1 - cyano - 2 - hydroxypropane - 2,3 - dicarboxylic acid to produce citric acid or a salt thereof.

4. A process according to claim 1 which comprises:
   (1) converting 1-chloro - 2 - hydroxy-propane - 2,3-dicarboxylic acid to an alkali metal salt of propane-1,2 - epoxide - 2,3 - dicarboxylic acid by reaction with an alkali metal hydroxide,
   (2) converting the alkali metal salt of propane - 1,2-epoxide - 2,3 - dicarboxylic acid to an alkali metal salt of 1 - cyano - 2 - hydroxy - propane - 2,3 - dicarboxylic acid via reaction with an alkali metal cyanide, and
   (3) hydrolyzing the alkali metal salt of 1 - cyano-2 - hydroxy - propane - 2,3 - dicarboxylic acid with a strong mineral acid to produce citric acid.

5. A process according to claim 1 which comprises:
   (1) converting 1 - chloro - 2 - hydroxy - propane - 2,3-dicarboxylic acid to an alkali metal salt of propane-1,2-epoxides - 2,3 - dicarboxylic acid by reaction with an alkali metal hydroxide,
   (2) converting the alkali metal salt of propane-1,2-epoxide - 2,3 - dicarboxylic acid to an alkali metal salt of 1-cyano - 2 - hydroxy - propane - 2,3 - dicarboxylic acid via reaction with an alkali metal cyanide, and
   (3) hydrolyzing the salt of 1 - cyano - 2 - hydroxypropane - 2,4 - dicarboxylic acid with alkali metal hydroxide in an aqueous system to produce an alkali metal salt of citric acid.

6. A process according to claim 1 wherein said 1-halo-2-hydroxy-propane - 2,3 - dicarboxylic acid or a salt or ester thereof is 1-chloro - 2 - hydroxy-propane - 2,3 - dicarboxylic acid or a salt or ester thereof.

7. A process according to claim 1 which comprises:
   (1) converting 1 - halo - 2 - hydroxy - propane - 2,3-dicarboxylic acid or a salt thereof to a salt of propane - 1,2 - epoxide - 2,3 - dicarboxylic acid by reaction in an aqueous system with a water soluble base having an ionization constant of at least $10^{-6}$ mols per liter,
   (2) converting the salt of propane - 1,2 - epoxide-2,3-dicarboxylic acid to a salt of 1 - cyano - 2 - hydroxypropane - 2,3 - dicarboxylic acid via a reaction in an aqueous system with a water soluble inorganic cyanide compound, and
   (3) hydrolyzing the salt of 1 - cyano - 2 - hydroxypropane - 2,3 - dicarboxylic acid to produce citric acid or a salt thereof.

8. The process of claim 1 wherein the reaction in step (2) is performed at a pH in the range of from about 9 to about 13.5.

9. A process according to claim 1 which comprises:
   (1) converting 1 - chloro - 2 - hydroxy - propane-2,3-dicarboxylic acid or a salt thereof to a salt of propane - 1,2 - epoxide - 2,3 - dicarboxylic acid by reaction in an aqueous system with NaOH or KOH or both,
   (2) converting the salt of propane - 1,2 - epoxide-2,3-dicarboxylic acid to a salt of 1-cyano - 2 - hydroxypropane - 2,3 - dicarboxylic acid via a reaction in an aqueous system at a pH of about 11.0 to about 13.2 with sodium cyanide or potassium cyanide or both, and
   (3) hydrolyzing 1 - cyano - 2 - hydroxy - propane-2,3-dicarboxylic acid to produce citric acid or a salt thereof.

10. A process for producing citric acid or salts thereof which comprises:
    (1) converting propane-1,2-epoxide-2,3 - dicarboxylic acid or a salt or ester thereof to 1-cyano-2-hydroxypropane-2,3-dicarxoylic acid or a salt or ester thereof by a reaction with cyanide, and
    (2) hydrolyzing 1-cyano-2-hydroxy-propane-2,3-dicarboxylic acid or a salt or ester thereof to produce citric acid or a salt thereof.

11. The process of claim 10 wherein the hydrolysis is conducted with mineral acid to produce citric acid.

12. The process of claim 10 wherein the hydrolysis is conducted with mineral acid to produce citric acid and wherein the citric acid is neutralized with a hydroxide, oxide, carbonate, or bicarbonate of an alkali metal or an alkaline earth metal to produce a salt of citric acid.

13. The process of claim 10 wherein the hydrolysis is conducted with an alkaline earth metal hydroxide, oxide, carbonate, or bicarbonate to produce an insoluble precipitate and the pricipitate is subsequently converted to citric acid by reaction with a mineral acid.

14. The process of claim 10 wherein the hydrolysis is conducted with an alkaline earth metal hydroxide, oxide or carbonate to produce an insoluble precipitate and the precipitate is subsequently converted to a soluble salt by reaction with ammonia, ammonium hydroxide or carbonate or an alkali metal oxide, hydroxide, carbonate or bicarbonate, or mixture thereof.

15. A process for producing citric acid or salts thereof which comprises:
   (1) hydrolyzing the cyano group of 1-cyano-2-hydroxy-propane-2,3-dicarboxylic acid or a salt of ester thereof to produce 1-carbamoyl-2-hydroxy-propane-2,3-dicarboxylic acid or a salt or ester thereof, and
   (2) hydrolyzing the 1-carbamoyl-2-hydroxy-propane-2,3-dicarboxylic acid or its salt or ester into citric acid or a salt thereof.

16. A process for producing citric acid or salts thereof as in claim 15 which comprises hydrolyzing 1-carbamoyl-2-hydroxy-propane-2,3-dicarboxylic acid or a salt or ester thereof to citric acid or a salt thereof wherein the hydrolysis is conducted with an alkaline earth metal hydroxide, oxide, carbonate or bicarbonate.

17. A process for producing citric acid or salts thereof which comprises:
   (1) hydrolyzing the cyano group of 1-halo-2-cyano-2-hydroxy-propane-3-carboxylic acid or a salt or ester thereof to produce 1-halo-2-hydroxy-propane-2,3-dicarboxylic acid or an ester thereof,
   (2) converting the 1-halo-2-hydroxy-propane-2,3-dicarboxylic acid or ester thereof to a salt or ester of propane-1,2-epoxide-2,3-dicarboxylic acid by a reaction with a base,
   (3) converting the salt or ester of propane-1,2-epoxide-2,3-dicarboxylic acid to a salt or ester of 1-cyano-2-hydroxy-propane-2,3-dicarboxylic acid via reaction with cyanide, and
   (4) hydrolyzing the salt or ester of 1-cyano-2- hydroxy-propane-2,3-dicarboxylic acid to produce citric acid or a salt thereof.

18. A process for producing citric acid or salts thereof which comprises:
   (1) subjecting 1-halo-2-oxo-propane-3-carboxylic acid or a salt or ester thereof to reaction with hydrogen cyanide or a salt thereof to produce 1-halo-2-cyano-2-hydroxy-propane - 3 - carboxylic acid or a salt or ester thereof,
   (2) hydrolyzing the cyano group of the 1-halo-2-cyano-2-hydroxy-propane-3-carboxylic acid or the salt or ester thereof to produce 1-halo-2-hydroxy-propane-2,3-dicarboxylic acid or an ester thereof,
   (3) converting the 1-halo-2-hydroxy-propane-2,3-dicarboxylic acid or the ester thereof to a salt or ester of propane-1,2-epoxide-2,3-dicarboxylic acid by a reaction with a base,
   (4) converting the salt or ester of propane-1,2-epoxide-2,3-dicarboxylic acid to a salt or ester of 1-cyano-2-hydroxy-propane-2,3-dicarboxylic acid via reaction with cyanide, and
   (5) hydrolyzing the salt or ester of 1-cyano-2-hydroxy-propane-2,3-dicarboxylic acid to produce citric acid or a salt thereof.

19. A process for producing citric acid or salts thereof which comprises:
   (1) hydrolyzing 1-halo-2-oxo-3-carbonyl halide to produce 1-halo-2-oxo-propane-3-carboxylic acid or a salt or ester thereof,
   (2) subjecting 1-halo-2-oxo-propane-3-carboxylic acid or a salt or ester thereof to reaction with hydrogen cyanide or a salt thereof to produce 1-halo-2-cyano-2-hydroxy-propane-3-carboxylic acid or a salt or ester thereof,
   (3) hydrolyzing the cyano group of 1-halo-2-cyano-2-hydroxy-propane-3-carboxylic acid or a salt or ester thereof to produce 1-halo-2-hydroxypropane-2,3-dicarboxylic acid or an ester thereof,
   (4) converting the 1-halo-2-hydroxy-propane-2,3-dicarboxylic acid or the ester thereof to a salt or ester of propane-1,2-epoxide-2,3-dicarboxylic acid thereof by a reaction with a base,
   (5) converting the salt or ester of propane-1,2-epoxide-2,3-dicarboxylic acid to a salt or ester of 1-cyano-2-hydroxy-propane-2,3-dicarboxylic acid via reaction with cyanide, and
   (6) hydrolyzing the salt or ester of the 1-cyano-2-hydroxy-propane-2,3-dicarboxylic acid to produce citric acid or a salt thereof.

20. A process for producing citric acid or salts thereof which comprises:
   (1) reacting 1-halo-2-oxo-3-carbonyl halide with water to produce 1-halo-2-oxo-propane-3-carboxylic acid,
   (2) reacting 1-halo-2-oxo-propane-3-carboxylic acid with cyanide ions and with ammonium, alkali metal or alkaline earth metal ions in an aqueous system to produce a salt of 1-halo-2-cyano-2-hydroxy-propane-3-carboxylic acid,
   (3) acidifying the salt of 1-halo-2-cyano-2-hydroxy-propane-3-carboxylic acid to produce 1-halo-2-cyano-2-hydroxy-propane-3-carboxylic acid and recovering the 1 - halo-2-cyano-2-hydroxy-propane-3-carboxylic acid,
   (4) hydrolyzing the cyano group of 1-halo-2-cyano-2-hydroxy-propane-3-carboxylic acid to produce 1-chloro-2-hydroxy-propane-2,3-dicarboxylic acid,
   (5) converting 1 - chloro-2-hydroxy-propane-2,3-dicarboxylic acid to a salt of propane-1,2-epoxide-2,3-dicarboxylic acid by a reaction with a base,
   (6) converting the salt of propane-1,2-epoxide-2,3-dicarboxylic acid to a salt of 1-cyano-2-hydroxy-propane-2,3-dicarboxylic acid via reaction with cyanide, and
   (7) hydrolyzing the salt of 1-cyano-2-hydroxy-propane 2,3-dicarboxylic acid to produce citric acid or a salt thereof.

21. A process for producing citric acid or the salts thereof which comprises:
   (1) reacting 1-chloro-2-oxo-3-carbonyl chloride with water to produce 1-chloro-2-oxo-propane-3-carboxylic acid,
   (2) reacting 1-chloro-2-oxo-propane-3-carboxylic acid with ammonium, alkali metal or alkaline earth metal ions and with cyanide ions in an aqueous system to produce a salt of 1-chloro-2-oxo-propane-3-carboxylic acid and HCN and reacting the salt of 1-chloro-2-oxo-3-carboxylic acid with HCN to form a salt of 2-chloro-2-cyano-2-hydroxy-propane - 3 - carboxylic acid,
   (3) acidifying the salt of 1-chloro-2-cyano-2-hydroxy-propane-3-carboxylic acid with mineral acid to produce 1-chloro-2-cyano-2-hydroxy-propane - 3 - carboxylic acid and a salt of the mineral acid,
   (4) solvent extracting the 2-chloro-2-cyano-2-hydroxy-propane-3-carboxylic acid to recover said acid from the salt of the mineral acid and recovering said acid from the solvent,
   (5) hydrolyzing the recovered 1-chloro-2-cyano-2-hydroxy-propane-3-carboxylic acid to produce 1-chloro-2-hydroxy-propane-2,3-dicarboxylic acid,
   (6) converting the 1-chloro-2-hydroxy-propane-2,3-dicarboxylic acid to a salt of propane-1,2-epoxide-2,3-dicarboxylic acid by reaction with a base,
   (7) reacting the salt of propane-1,2-epoxide-2,3-dicarboxylic acid with mineral acid to convert the salt to an acid structure forming propane-1,2-epoxide-2,3-dicarboxylic acid and a salt of the mineral acid and the base reaction at step (6),
   (8) recovering the propane-1,2-epoxide-2,3-dicarboxylic acid,
   (9) converting the propane-1,2-epoxide-2,3-dicarboxylic propane-2,3-dicarboxylic acid by reacting the acid with ammonium, alkali metal or alkaline earth metal ions and with cyanide ions in an aqueous system at a pH from about 8 to about 12, and
   (10) hydrolyzing the salt of 1-cyano-2-hydroxy-propane-2,3-dicarboxylic acid with a hydroxide, oxide or carbonate of an alkali metal or alkaline earth metal to produce a salt of citric acid, 22. The process of claim 21 wherein the step (9) conversion of propane-1,2-epoxide-2,3-dicarboxylic acid to a salt of 1-cyano-2-hydroxy-propane-2,3-dicarboxylic acid is performed in two steps of:
   (A) the propane-1,2-epoxide-2,3-dicarboxylic acid reacted with a base to form a salt of propane-1,2-epoxide-2,3-dicarboxylic acid and then
   (B) the salt of propane - 1,2-epoxide-2,3-dicarboxylic acid is reacted with cyanide ions in an aqueous system at a pH of from about 8 to about 14.

23. A process of producing citric acid or the salts thereof which comprises:
   (1) reacting 1-halo-2-oxo-3-carbonyl halide with water to produce 1-halo-2-oxo-propane-3-carboxylic acid,
   (2) reacting 1 - halo-2-oxo-propane-3-carboxylic acid with ammonium, alkali metal or alkaline earth metal ions and with cyanide ions in an aqueous system to produce a salt of 1-halo-2-oxo-propane-3-carboxylic acid and HCN and reacting the salt of 1-halo-2-oxo-propane-3-carboxylic acid with HCN to form a salt of 1 - halo-2-cyano-2-hydroxy-propane-3-carboxylic acid,
   (3) solvent extracting the 1-halo-2-cyano-2-hydroxy-propane-3-carboxylic acid salt to recover said salt,
   (4) hydrolyzing the cyano group of the recovered 1-halo-2-cyano-2-hydroxy-propane-3 - carboxylic acid salt to convert it to a salt of 1-halo-2-hydroxy-propane-2,3-dicarboxylic acid,
   (5) converting the salt of 1-halo-2-hydroxy-propane-2,3-dicarboxylic acid to a salt of propane-1,2-epoxide-2,3-dicarboxylic acid by reaction with a base,
   (6) reacting the salt of propane-1,2-epoxide-2,3-dicarboxylic acid with mineral acid to convert the salt to an acid structure forming propane-1,2-epoxide-2,3-dicarboxylic acid and a salt of the mineral acid and of the base reacted at step (5),
   (7) recovering the propane-1,2-epoxide-2,3-dicarboxylic acid,
   (8) converting the propane-1,2-epoxide-2,3-dicarboxylic acid to a salt of 1-cyano-2-hydroxy-propane-2,3-dicarboxylic acid by reacting the acid with ammonium, alkali metal or alkaline earth metal ions and with cyanide ions in an aqueous system at a pH of from about 8 to about 14, and
   (9) hydrolyzing the salt of 1-cyano-2-hydroxy-propane-2,3-dicarboxylic acid to produce citric acid or a salt thereof.

24. A process for producing citric acid or the salts thereof which comprises:
   (1) reacting 1-halo-2-oxo-3-carbonyl halide with water to produce 1-halo-2-oxo-propane-3-carboxylic acid,
   (2) reacting 1 - halo-2-oxo-propane-3-carboxylic acid with hydrogen cyanide to produce 1-halo-2-cyano-2-hydroxy-propane-3-carboxylic acid,
   (3) hydrolyzing the 1-halo - 2 - cyano-2-hydroxy-propane-3-carboxylic acid with water to produce 1-halo-2-hydroxy-propane-2,3-dicarboxylic acid,
   (4) converting the 1 - halo-2-hydroxy-propane-2,3-dicarboxylic acid to a salt of propane-1,2-epoxide-2,3-dicarboxylic acid by reaction with a base,
   (5) reacting the salt of propane-1,2-epoxide-2,3-dicarboxylic acid with mineral acid, to convert the salt to an acid structure forming propane-1,2-epoxide-2,3-dicarboxylic acid and a salt of the mineral acid and of the base reacted at step (4),
   (6) recovering the propane-1,2-epoxide-2,3-dicarboxylic acid,
   (7) converting the propane-1,2-epoxide-2,3-dicarboxylic acid to a salt of 1-cyano-2-hydroxy-propane-2,3-dicarboxylic acid by reacting the acid with ammonium, alkali metal or alkaline earth metal ions and with cyanide ions in an aqueous system at a pH of from about 8 to about 14, and
   (8) hydrolyzing the salt of 1-cyano-2-hydroxy-propane-2,3-dicarboxylic acid to produce citric acid of a salt thereof.

25. A process for producing citric acid or the salts thereof which comprises:
   (1) reacting 1-halo-2-oxo-3-carbonyl halide with water to produce 1-halo-2-oxo-propane-3-carboxylic acid,
   (2) reacting 1-halo-2-oxo-propane-3-carboxylic acid with ammonium, alkali metal or alkaline earth metal ions and with cyanide ions in an aqueous system to produce a salt of 1-halo-2-oxo-propane-3-carboxylic acid and HCN and reacting the salt of 1-halo-2-oxo-propane-3-carboxylic acid with HCN to form a salt of 1-halo - 2 - cyano-2-hydroxy-propane-3-carboxylic acid,
   (3) acidifying the salt of 1-halo-2-cyano-2-hydroxy-propane-3-carboxylic acid with mineral acid to produce 1-halo-2-cyano-2-hydroxy-propane-3-carboxylic acid and a salt of the mineral acid,
   (4) solvent extracting the 1-halo-2-cyano-2-hydroxy-propane-3-carboxylic acid to recover said acid from the salt of the mineral acid, and recovering said acid from the solvent,
   (5) hydrolyzing the recovered 1-halo-2-cyano-2-hydroxy-propane-3-carboxylic acid to produce 1-halo-2-hydroxy-propane-2,3-dicarboxylic acid,
   (6) converting the 1-halo-2-hydroxy-propane-2,3-dicarboxylic acid to a salt of propane-1,2-epoxide-2,3-dicarboxylic acid by reaction wtih a base,
   (7) converting the salt of propane-1,2-epoxide-2,3-dicarboxylic acid to a salt of 1-cyano-2-hydroxy-propane-2,3-dicarboxylic acid by reacting the salt with cyanide ions in an aqueous system at a pH of from about 8 to about 14, and
   (8) hydrolyzing the salt of 1-cyano-2-hydroxy-propane-2,3-dicarboxylic acid to produce citric acid or a salt thereof.

26. A process for producing citric acid or the salts thereof which comprises:
   (1) reacting 1-halo-2-oxo-3-carbonyl halide with water to produce 1-halo-2-oxo-propane-3-carboxylic acid,
   (2) reacting 1-halo-2-oxo-propane-3-carboxylic acid with ammonium, alkali metal or alkaline earth metal ions and with cyanide ions in an aqueous system to produce a salt of 1-halo-2-oxo-propane-3-carboxylic acid and HCN and reacting the salt of 1-halo-2-oxo-propane-3-carboxylic acid with HCN to form a salt of 1-halo-2-cyano - 2 - hydroxy-propane-3-carboxylic acid,
   (3) hydrolyzing the cyano group of thesalt of 1-halo-2-cyano - 2 - hydroxy-propane-3-carboxylic acid with water and mineral acid to produce 1-halo-2-hydroxy-propane-2,3-dicarboxylic acid,
   (4) converting the 1-halo-2-hydroxy-propane-2,3-dicarboxylic acid to a salt of propane-1,2-epoxide-2,3-dicarboxylic acid by reaction with a base,
   (5) converting the salt of propane-1,2-epoxide-2,3-dicarboxylic acid to a salt of 1-cyano-2-hydroxy-propane-2,3-dicarboxylic acid by reacting the salt with cyanide ions in an aqueous system at a pH of from about 8 to about 14, and
   (6) hydrolyzing the salt of 1-cyano-2-hydroxy-propane-2,3-dicarboxylic acid to produce citric acid or a salt thereof.

27. A process for producing citric acid or the salts thereof which comprises:
   (1) reacting 1-halo-2-oxo-3-carbonyl halide with water to produce 1-halo-2-oxo-propane-3-carboxylic acid,
   (2) reacting 1-halo-2-oxo-propane-3-carboxylic acid with hydrogen cyanide to produce 1-halo-2-cyano-2-hydroxy-propane-3-carboxylic acid,
   (3) hydrolyzing the 1-halo-2-cyano-2-hydroxy-propane-3-carboxylic acid with water to produce 1-halo-2-hydroxy-propane-3-carboxylic acid, (4) converting the 1-halo-2-hydroxy-propane-2,3-dicarboxylic acid to a salt of propane-1,2-epoxide-2,3-dicarboxylic acid by reaction with a base,
(5) converting the salt of propane-1,2-epoxide-2,3-dicarboxylic acid to a salt of 1-cyano-2-hydroxy-propane-2,3-dicarboxylic acid by reacting the salt with cyanide ions in an aqueous system at a pH of from about 8 to about 14, and
(6) hydrolyzing the salt of 1-cyano-2-hydroxy-propane-2,3-dicarboxylic acid to produce citric acid or a salt thereof.

References Cited

JACS, 72, 5019–5024 (1950).

LORRAINE A. WEINBERGER, Primary Examiner

P. J. KILLOS, Assistant Examiner

U.S. Cl. X.R.

260—348 A, 348.6, 465.4, 483, 484 P, 534 E, 539 R, 544 Y

PO-1050
(5/69)

UNITED STATES PATENT OFFICE
CERTIFICATE OF CORRECTION

Patent No. 3,769,338                    Dated  October 30, 1973

Inventor(s)  Michael J. Dagani et al

It is certified that error appears in the above-identified patent and that said Letters Patent are hereby corrected as shown below:

Column 2, line 63, reads "vis", should read -- viz, --; line 69, delete "A strongly acidic environ-". Column 3, lines 1 and 2, delete "ment in the hydrolysis results in the conversion of esters to salts."; line 24, after "structure", insert -- which cyanohydrin structure --. Column 4, line 12, delete "bonyl-propane"; line 15, reads "3-ethoyx", should read -- 3-ethoxy --; line 32, reads "2.3-disodium salt of", should read -- 2,3-disodium salt of --; line 34, reads "Na. K. Rb. Cs)" should read, -- Na, K, Rb, Cs)--. Column 6, line 54, reads "sats", should read -- salts --; line 58, reads "cacium", should read -- calcium --. Column 7, line 23, reads "2,668,640", should read -- 2,688,640 --. Column 8, line 3, reads "accepable", should read -- acceptable --. Column 10, line 11, reads "20 percent", should read -- 29 percent --; line 15, reads "95-77°", should read -- 95-97° --. Column 13, line 20, reads "salt of ester", should read, -- salt or ester --; line 31, reads "2,4-", should read, -- 2,3- --. Column 14, line 51, reads "dicarxoylic", should read -- dicarboxylic --. Column 16, line 67, after "dicarboxylic", insert -- acid to a salt of 1-cyano-2-hydroxy- --. Column 18, line 50, reads "thesalt", should read -- the salt -- .

Signed and sealed this 18th day of June 1974.

(SEAL)
Attest:

EDWARD M. FLETCHER, JR.
Attesting Officer

C. MARSHALL DANN
Commissioner of Patents